United States Patent
Mauborgne et al.

(10) Patent No.: US 10,317,568 B2
(45) Date of Patent: Jun. 11, 2019

(54) METHOD AND SYSTEM FOR CORRECTING A NATURAL GAMMA-RAY MEASUREMENT PERFORMED IN A WELLBORE

(71) Applicant: SCHLUMBERGER TECHNOLOGY CORPORATION, Sugar Land, TX (US)

(72) Inventors: Marie-Laure Mauborgne, Clamart (FR); Francoise Allioli, Clamart (FR); Fabien Haranger, Princeton, NJ (US); Christian Stoller, Princeton Junction, NJ (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 15/182,686

(22) Filed: Jun. 15, 2016

(65) Prior Publication Data

US 2017/0363770 A1    Dec. 21, 2017

(51) Int. Cl.
*G01V 5/10* (2006.01)
*G01V 13/00* (2006.01)
*G01V 5/06* (2006.01)

(52) U.S. Cl.
CPC ............ *G01V 13/00* (2013.01); *G01V 5/06* (2013.01); *G01V 5/101* (2013.01)

(58) Field of Classification Search
CPC .. G01T 1/40; G01D 18/00; H04N 5/33; G01J 5/522; A61B 6/583
See application file for complete search history.

(56) References Cited

U.S. PATENT DOCUMENTS

| 4,857,729 A * | 8/1989 | Gadeken ............ E21B 47/1015 250/256 |
| 7,081,616 B2 | 7/2006 | Grau et al. |

(Continued)

*Primary Examiner* — David P Porta
*Assistant Examiner* — Mamadou Faye

(57) ABSTRACT

The disclosure relates to a method for correcting a downhole natural gamma-ray measurement performed in a wellbore. A gamma-ray measurement including at least a gamma-ray count rate is obtained by a gamma-ray detector disposed in a bottom hole assembly having a mud channel inside of the assembly, such that mud flows downwards in the mud channel and upwards outside of the assembly and a neutron source situated above the gamma-ray detector and activating the mud. The method includes:

Determining from the gamma-ray measurement an interval count rate corresponding to a count rate of gamma-rays having an energy within a predetermined correction interval;

Computing an outside and an inside calibration ratio (ratio of a gamma ray count rate in the correction interval to a gamma-ray count rate outside of the correction interval) representative of gamma-rays generated by an activation of mud flowing respectively outside of the assembly and inside of the assembly, Based on the outside calibration ratio and the interval count rate, determining a first correction count rate, Based on at least the inside and the outside calibration ratios, determining a second correction count rate, Subtracting from the total count rate the first and second correction count rates in order to get a natural gamma-ray measurement corrected for mud activation.

20 Claims, 5 Drawing Sheets

(56) References Cited

U.S. PATENT DOCUMENTS

2005/0127282 A1\* 6/2005 Grau .................. G01V 5/101
 250/262
2007/0241275 A1\* 10/2007 Guo .................. G01V 5/101
 250/269.1
2009/0321622 A1\* 12/2009 Stoller .................. G01V 5/10
 250/269.3

\* cited by examiner

METHOD AND SYSTEM FOR CORRECTING A NATURAL GAMMA-RAY MEASUREMENT PERFORMED IN A WELLBORE

BACKGROUND

The invention relates generally to gamma-ray logging in a borehole.

Measuring gamma-rays with a detector located within a borehole is a common operation in well logging.

Natural gamma-rays are emitted in a decay of subsurface materials such as thorium, uranium and potassium (Th, U, K), each of which emits a characteristic spectrum resulting from an emission of gamma-rays at various energies. The natural gamma-ray measurement is particularly useful in the exploration for exploitation of oil and gas resources because it is believed that the concentrations of Th, U, K taken individually or in combination are a good indication of previously unavailable information as to the presence, type and volume of shale or clay in the formations surrounding the borehole.

A detector in a spectral mode, i.e. a detector that is sensitive to the energy of the gamma-rays, may provide a gamma-ray spectrum, i.e. a gamma-ray count rate as a function of energy.

Furthermore, a gamma-ray detector may also detect neutron-induced gamma-rays. Using a neutron source in a logging tool for obtaining a characteristic of a formation surrounding a borehole is well known, particularly for measuring a formation porosity and lithology.

The neutron source may be an electronic generator of neutrons, which, using the d-T neutron reaction, allows to irradiate the formation with neutrons having a high energy (about 14 MeV). As a consequence, there is a significant number of nuclei in the formation, as well as in the borehole and inside the tool, which are transmuted into radioactive elements.

In particular, oxygen-16 nuclei may be converted into nitrogen-16 nuclei; the radioactive nitrogen atoms decay quickly by beta decay mostly to an excited state of oxygen, which in turn decays by emitting gamma-rays. A majority of the emitted gamma-rays have an energy around 6.1 MeV, which is much higher than gamma-ray energies from naturally occurring radioactive materials, which do not exceed 2.615 MeV. The drilling mud contains elements, in particular oxygen, that may be activated as explained above.

It is hence possible to detect within the borehole gamma-rays from a plurality of sources.

Gamma-ray logging may be performed during a drilling operation in the earth formation, so as to provide information about the formation surrounding a drilled portion of the borehole as soon as possible. FIG. 1 shows a schematic view of an example of a system for logging while drilling. A logging while drilling tool 108 comprises a drill bit 101 at an end of a drill string 103. The drill string 103 is used to drill a borehole 102. Logging tools (104, 105, 109) are disposed within the bottom hole assembly (BHA) 111, which is part of the drill string 103. Mud is carried through the mud channel 106 to the drill bit 101 at the bottom of the BHA 111. The drilling mud is pumped down from the surface to the drill bit 101, where it helps clear cuttings and bring them to the surface through an annulus between the drill string 103 and a formation 107.

One of the logging tools (104, 105, 114) may contain a neutron generator 110 that irradiates the formation 107 with high energy neutrons, so as to provide a mapping of the porosity of the formation 107 for instance. Such generator may be a pulsed neutron generator. A gamma-ray detector 109 may be provided close to the neutron generator to measure gamma-rays induced by the generated neutrons.

Furthermore, a gamma-ray detector 112 of the logging tool 105 may measure the natural gamma-ray activity of the formation 107. The gamma-ray detector 112 intended to measure the natural gamma-ray activity, may also detect gamma-rays produced by the decay of elements in the mud such as oxygen that were activated when they passed the neutron generator on the way to the bit. These additional gamma rays may perturb the natural gamma ray measurement. The gamma rays originating from the mud may be emitted when the mud passes in front of the gamma-ray detector inside of the assembly or in the annulus between the assembly and the formation. The signal obtained by the gamma-ray detector 112 may then need to be corrected to eliminate from the natural gamma-ray estimation the gamma-rays produced by the decay of radioactive elements created by the neutron flux of the generator.

The measurements taken downhole are transmitted to a downhole computer 113 comprising a memory storing the data obtained from the sensors and a processor for processing the obtained measurement. All or part of the processed information obtained from the measurements may be transmitted to a telemetry system (not shown) for communicating with the surface. Such telemetry system may be a mud pulse telemetry. Alternatively, the information may be retrieved from the computer memory when the BHA is brought back to the surface. The retrieved or transmitted data may be processed by a processor situated at the surface, at the wellsite or remotely.

An approach for correcting the gamma-ray estimation consists of determining one or more standard spectra for the gamma rays emitted by the activated mud. The one or more standard spectra may include one or more spectra related to a radioactive isotope (i.e. nitrogen-16) from the activation of oxygen by neutrons emitted by the neutron generator. The measured gamma-ray spectrum may then be analyzed as a combination of the standard spectra of the elements of the formation generating natural gamma-ray as well as the one or more standard spectra of the mud activation. From this analysis, it is possible to derive the part of the spectrum due to the mud activation and to correct the total count rate measured by the gamma ray detector by subtracting the count rate due to the detection of gamma rays from activated mud.

U.S. Pat. No. 7,081,616 from the Applicants already discloses a correction method including analyzing the measured gamma-ray spectrum, determining an interval count rate corresponding to the count of gamma-rays having an energy in a predetermined correction interval above a predetermined threshold (the threshold corresponding generally to an energy threshold that natural gamma rays do not reach) and determining a correction count rate from the interval count rate. The correction count rate, corresponding to the gamma rays derived from oxygen activation generated by the neutron generator may then subtracted from the total count rate.

SUMMARY

The disclosure relates to a method for correcting a downhole natural gamma-ray measurement performed in a wellbore. The gamma-ray measurement includes gamma-ray count rates obtained by a gamma-ray detector disposed in a bottom hole assembly. The bottom hole assembly has also a mud channel inside of the assembly, such that mud flows downwards in the mud channel and upwards outside of the assembly and a neutron source situated above the gamma-ray detector and activating the mud. The method includes determining from the gamma-ray measurement an interval count rate corresponding to a count rate of gamma-rays having an energy within a predetermined correction interval. It also comprises computing an outside and an inside calibration ratio representative of gamma-rays generated by an activation of mud flowing respectively outside of the assembly and inside of the assembly, wherein the calibration ratio is a ratio of a gamma ray count rate in the correction interval to a gamma-ray count rate outside of the correction interval. This calibration ratio may be determined before the gamma-ray measurement, or after the gamma-ray measurement, on site, in a lab or via modelling. The method also includes, determining a first correction count rate based on the outside calibration ratio and the interval count rate and a second correction count rate based on the inside and the outside calibration ratios and then subtracting from the total count rate the first and second correction count rates.

This provides an accurate correction for the mud activation in the natural gamma-ray measurement even when the activation generated by the neutron source is substantive.

The disclosure also relates to a system for correcting a downhole natural gamma-ray measurement performed in a wellbore. A gamma-ray measurement including gamma-ray count rates is obtained by a gamma-ray detector disposed in a bottom hole assembly (BHA). The BHA also has a mud channel inside the assembly, such that mud flows downwards in the mud channel and upwards outside of the assembly, and a neutron source situated above the gamma-ray detector that activates the mud The system comprises as a processor configured to determine from the gamma-ray measurement an interval count rate corresponding to gamma-rays having an energy within a predetermined correction interval. The processor also determine a first correction count rate based on an outside calibration ratio corresponding to the ratio of a gamma ray count rate in the correction interval to a gamma-ray count rate outside of the correction interval representative of gamma-rays generated by the activation of mud flowing outside of the assembly, and on the interval count rate as well as a second correction count rate based on an inside calibration ratio corresponding to the ratio of a gamma ray count rate in the correction interval to a gamma-ray count rate outside of the correction interval representative of the activation of mud flowing inside of the assembly, and on the outside calibration ratio. The processor also subtracts from the total count rate obtained from gamma-ray measurement the first and second correction count rates.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments of the present disclosure will be described below. These described embodiments are examples of the presently disclosed techniques. Additionally, in an effort to provide a concise description of these embodiments, some features of an actual implementation may not be described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would still be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

A system for logging while drilling as presented in the prior art section may measure different parameters while drilling the wellbore, such as the gamma-rays measured by detector 109 generated in the formation following the emission of neutrons in the formation by generator 110 or the natural gamma-rays of the formation, measured by detector 112.

This system is exemplary and bottom hole assemblies (BHA) having many different architectures are also able to measure different types of gamma-rays. For instance, in system 100, gamma-ray detector 112 may be in the same downhole tool as the neutron generator 110. Other combinations of downhole tools may also be present in the bottom hole assembly.

Figure 5:
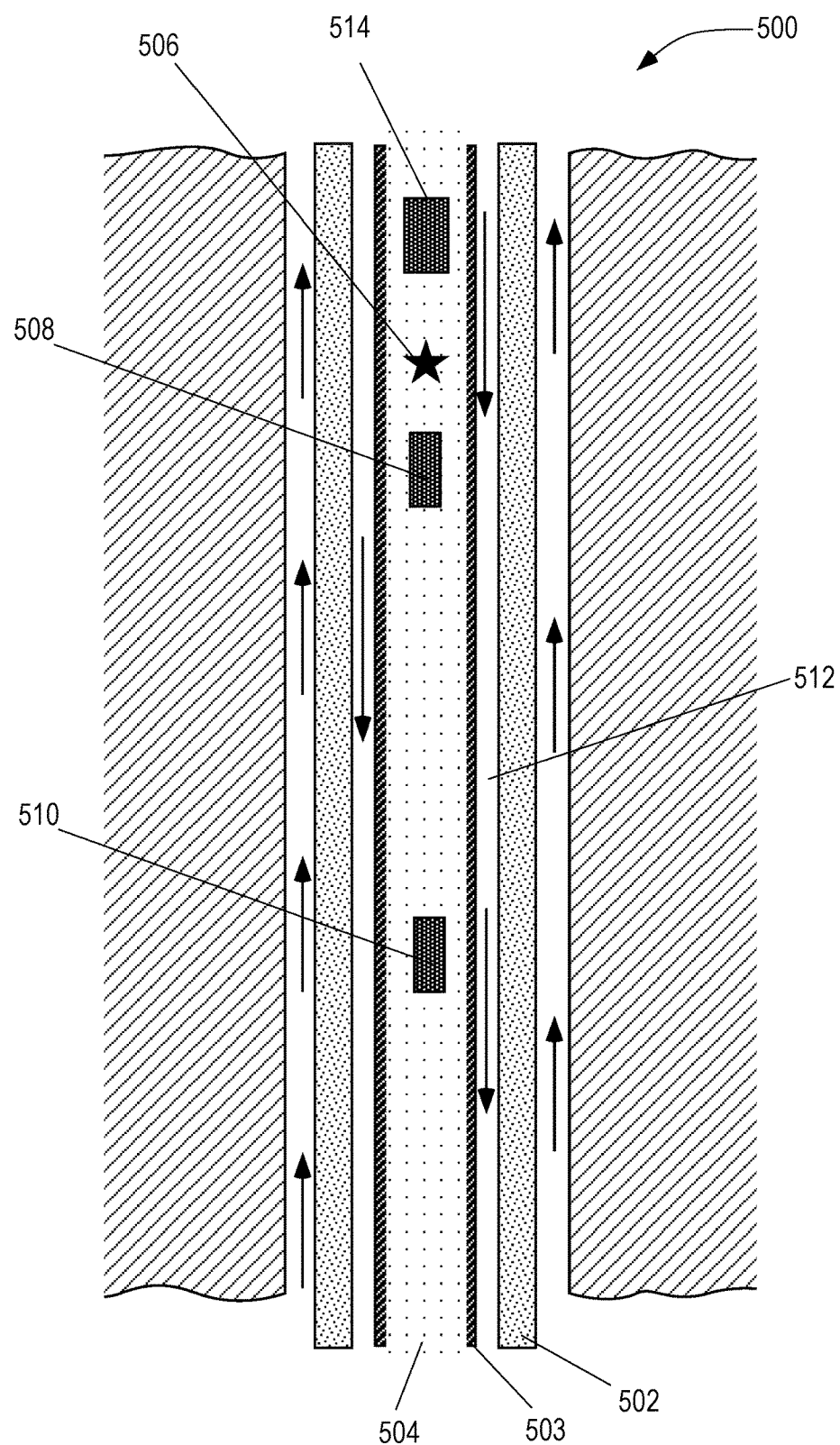
FIG. 5 is a schematic view of part of another type of BHA for drilling a borehole

Another system 500 for logging while drilling is also shown on FIG. 5. In FIG. 5, only the bottom hole assembly of this system is shown but this system also comprises a drill string above the BHA and a drill bit below. The BHA comprises a "mandrel tool" and comprises a collar 502 and a chassis 504 surrounded by a pressure housing 503 inside the collar. The mud flows down in the annular space 512 constituting a mud channel between the inner collar wall and the pressure housing. A neutron source 506 such as a pulsed neutron generator is disposed inside the chassis, as well as a first gamma-ray detector 508 similar to gamma-ray detector 109 disposed close to the PNG and a second gamma-ray detector 510 situated below the PNG to measure natural gamma-rays. As disclosed in relationship with the system 100, the tool may also comprise a computer 514 situated inside of the pressure housing delimiting the chassis.

More generally, the method according to the disclosure may apply to any bottom hole assembly having a mud channel for the mud passage inside the BHA, as well as a neutron generator and a gamma-ray detector, the gamma-ray detector being situated below the neutron generator.

However, dealing with several measurements in the same bottom hole assembly may be complicated, no matter the architecture of the BHA. Indeed, as explained above, the mud circulating in the mud channel and then in the annulus between the BHA and the borehole wall may contain activated isotopes such as nitrogen-16 from the activation of oxygen-16 that may emit gamma-rays. The gamma-rays emitted by oxygen activated in the circulating mud are not natural gamma-rays emitted by the formation and are therefore a perturbation of the natural gamma-ray measurement if they are detected by the detector 112, 210.

Existing correction methods rely on determining a standard spectrum corresponding to the standard gamma ray spectrum resulting from the decay of the activated mud and to correct the natural gamma-ray measurement based on the data of the standard spectrum of the activated mud.

Figure 2:
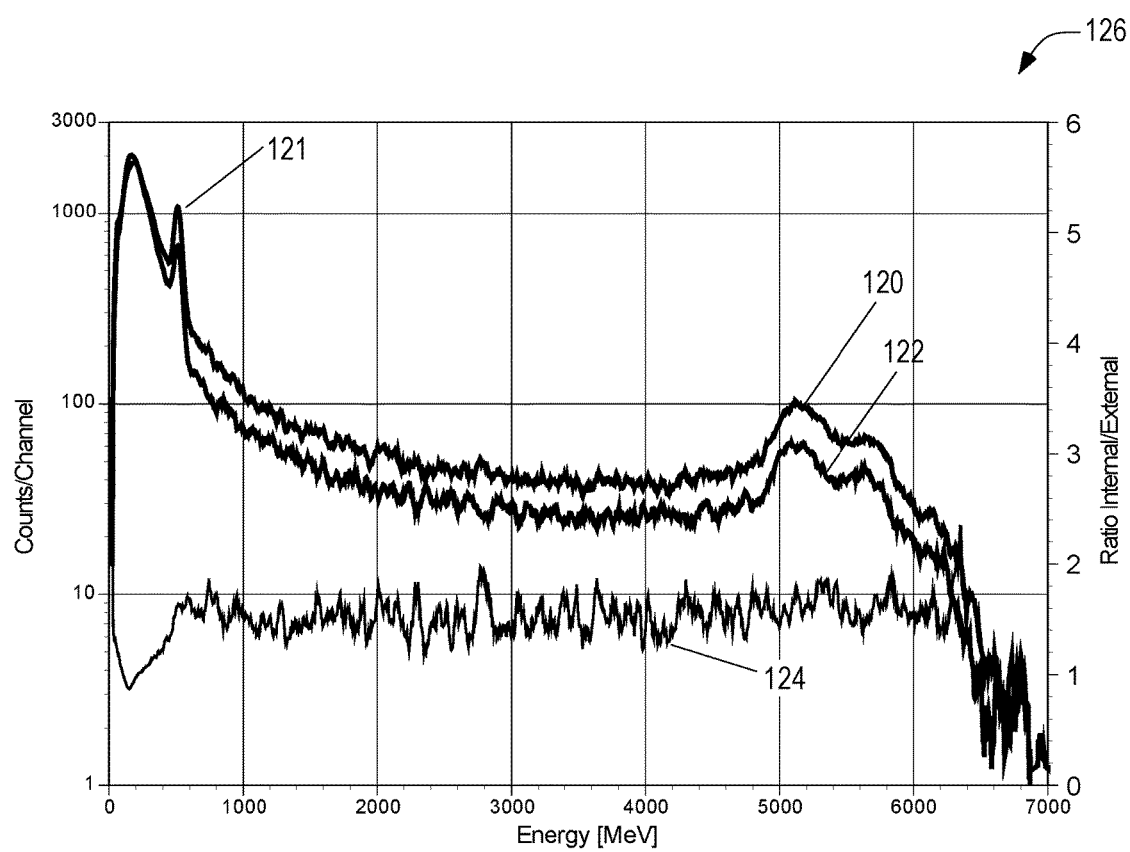
FIG. 2 is a plot showing standard spectra from the decay of activated mud situated inside and outside a downhole assembly such as the one of FIG. 1.

However, the gamma-rays coming from the circulating mud and likely to be detected by the detector 112, 510 may come not only from the mud circulating inside the mud channel 106, 512 inside of the BHA but also from the mud flowing up outside of the BHA. The inventors have ascertained that the standard spectra from the mud situated inside of the BHA and outside of the BHA may not be the same, as can be seen in the graph 126 of FIG. 2 showing the inside standard spectrum 120 (corresponding to the standard spectrum of the mud circulating in the mud channel 106 inside of the drill string), the outside standard spectrum 122 (corresponding to the standard spectrum of the mud circulating between the drill string and the borehole wall, outside of the drill string) as well as the ratio 124 of the inside and outside standard spectra, that may vary from 0.8 to 2.0 depending on the energy range. In particular, there is a large change in the ratio below about 500 keV. The gamma ray peak 121 corresponds to the energy of one of the two gamma rays resulting from positron annihilation. Further, the relative contributions of the mud activated inside and outside of the drill string may vary depending on several drilling parameters. In many cases, the previously applied correction is sufficient but for some configurations of the BHA, it has been found that the discrepancy between inside and outside mud standard spectra may generate inaccuracies in the corrected natural gamma-ray measurement.

The relative contributions of activation gamma rays originating inside the BHA and outside the BHA may also vary as a function of the drilling conditions and the BHA layout. This is due to the fact that the activated nitrogen-16 decays with a half-life of 7.1 s, i.e. 7.1 s after the activation only half of the nitrogen-16 nuclei will remain. The flow speed inside the mud channel is much higher than the speed of the upflow outside of the BHA. A typical flow speed in a mud channel with a cross sectional area of 20 cm² may be about 12 m/s. Assuming that the gamma ray detector 112 is about 4 m below the neutron generator 110 the activated mud travels from the source to the detector in 0.3 s. During this time the activation signal only decreases by 3%. The mud then continues to the bit 101 and moves back up in the annulus between the BHA 111 and the borehole wall 102. The cross section of the annulus may be about 140 cm² and the upflow speed will be lower by the ratio of the inner and outer cross sections, i.e. 1/7×12 m/s=1.7 m/s If one assumes further that the detector 112 is 10 m above the bit 101, then the mud takes about 0.8 s to reach the bit after passing the detector and it will then flow up at 1.7 m/s and will reach the detector 112 on the way up 5.9 s after passing the bit or 6.7 s after passing the detector. This means that the activation has decreased by almost a factor 2 since passing the detector on the way down. If the detector were closer to the bit, e.g. at 4 m, then the mud would only take 2.6 s from the time it passes the detector 112 on the way down to the time it reaches the detector 112 again on the way up. Correspondingly, the relative contribution from the outside compared to the inside would be about 50% higher. Other effects, such as washouts in the borehole will impact the flow speed and change the ratio between the inside and the outside.

The correction method according to the disclosure corrects the natural gamma-ray measurement taking this discrepancy into account.

Figure 3:
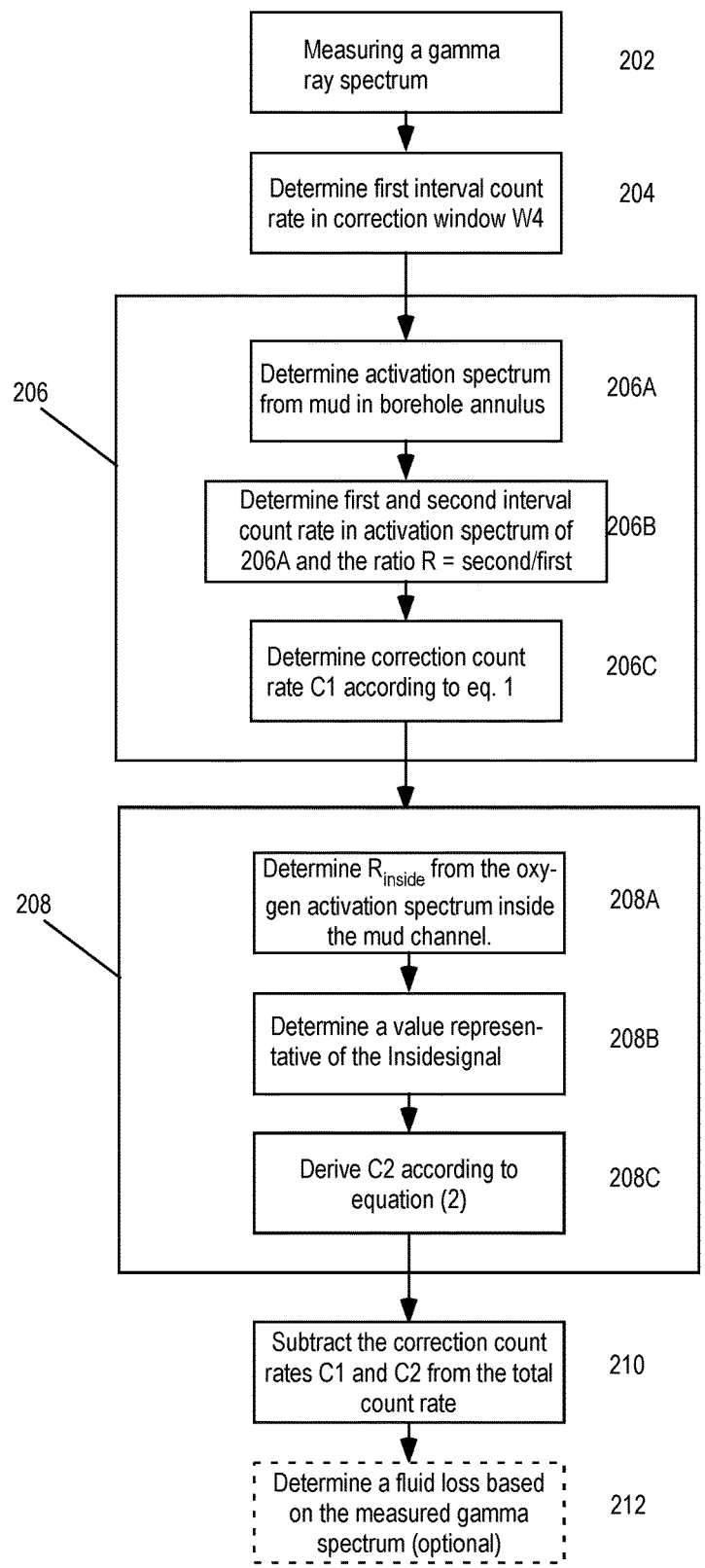
FIG. 3 is a flowchart of the method according to an embodiment of the disclosure.

In an embodiment of the disclosure, the correction method 200 shown in FIG. 3 comprises measuring a natural gamma-ray spectrum (block 202) obtained from a gamma-ray detector such as detector 112. This gamma-ray spectrum corresponds to natural gamma-rays emitted by the formation as well as perturbing gamma-rays, i.e. gamma-rays coming from activated mud. This operation may also comprise post-processing the signal obtained directly from the gamma-ray detector for instance by stabilizing the signal gain as already known in the art, e.g. from U.S. Pat. No. 7,081,616.

Figure 4:
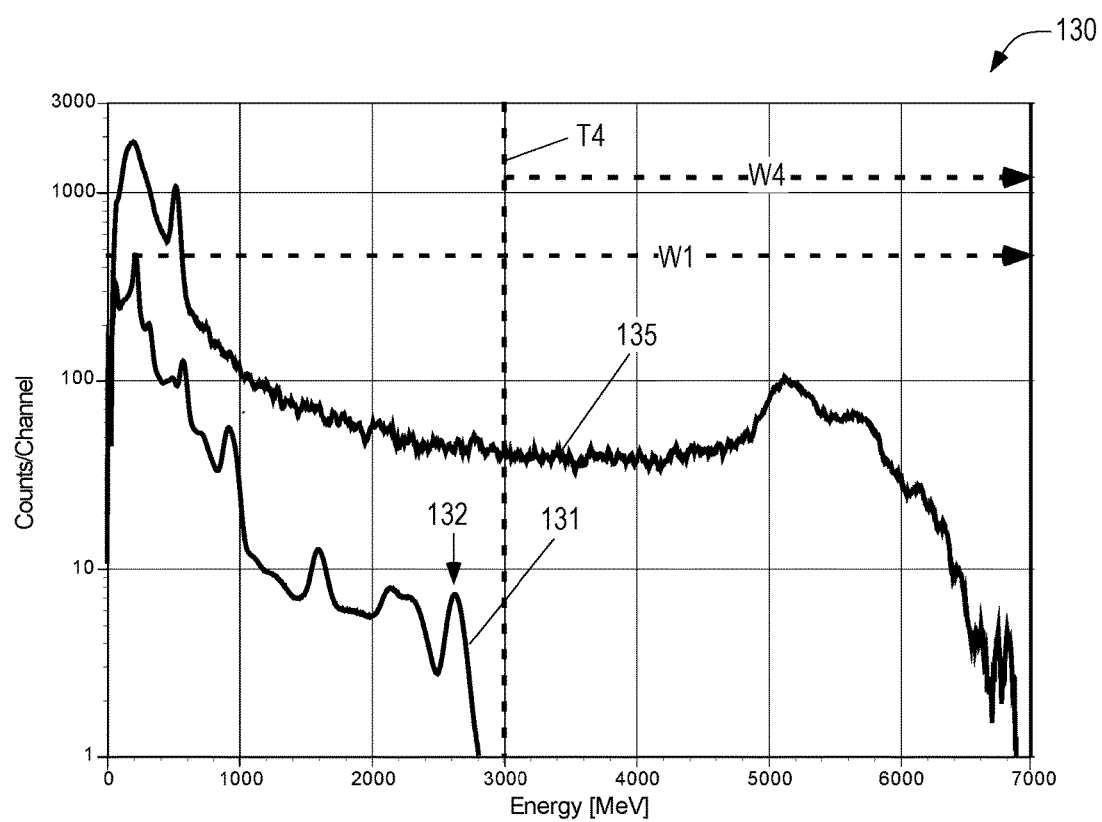
FIG. 4 is a plot of a gamma-ray spectrum.

The graph 130 in FIG. 4 shows an oxygen activation spectrum 135 and a natural gamma ray spectrum 131 measured with the same detector. Two windows, W1 and W4 are shown. W1 encompasses the entire spectrum, while W4, which starts above threshold T4, only encompasses the energy range above the natural gamma ray spectrum, which has its highest energy at the 2615-keV gamma ray 132 from the thorium decay chain.

The method then comprises determining a first interval count rate $TC4^{measured}$ (block 204), the interval count rate corresponding to gamma-rays having an energy within a predetermined interval (W4), called correction interval as shown in FIG. 4. This correction interval W4 is a semi-infinite interval above a predetermined correction threshold T4, corresponding to an energy threshold that the natural gamma-rays coming from the formation do not reach. This gamma threshold may be set above the highest gamma ray energy found in natural gamma ray logging, which is about 2.615 keV. Since the resolution of the corresponding peak is finite, it is advantageous to set the threshold above about 3 MeV (3.5 MeV in the present embodiment) to avoid including natural gamma-rays in the correction. As the gamma-rays coming from the formation cannot reach such an energy level, it is considered that the count rate in this interval is generated entirely by oxygen activation in the mud. In the following, the entire energy range constitutes an interval designated as W1, which is a semi-infinite interval starting at the lowest detected energy (about 50 keV).

A second gamma ray count rate $TC14^{measured}$ may comprise the count rate from all the counts in an energy interval below threshold T4 and can be determined as the difference between the total count rate $TC1^{measured}$ which comprises all the counts in W1 and the counts TC4 in the correction interval W4. $TC14^{measured}$ becomes $TC14^{measured}=TC1^{measured}-TC4^{measured}$.

Based on this measurement, prior art used a global correction for the contributions from oxygen activation in the mud channel and in the borehole annulus as indicated in equation (1), where $TC_{NGR}$ is the count rate attributed to natural gamma rays after correcting for the contribution from activated oxygen C0.

$$TC_{NGR} = TC14 \ C0 \quad (1)$$

and the correction C0 is as defined in equation (1a) below.

$$C0 = TC1^{activation} = TC4^{measured}(1+R) = TC4^{measured}\left(1+\left(\frac{TC14}{TC4}\right)_{cal}\right) \quad (1a)$$

The ratio R is determined by a calibration measurement and it is assumed that the ratio between the high energy part of the measured activation spectrum (TC4) and the low energy part (TC14) is independent of the location from which the activation gamma ray originates. As indicated above, this may only work in special circumstances.

The new method overcomes this limitation by making a correction in two parts. A first correction C1 is made, using the ratio $R_{outside}$ defined below, which is determined for activation gamma rays originating in the borehole annulus only. A second correction corrects for the bias introduced by this assumption.

This based on the fact that the relative contribution of the activation signal originating from the borehole annulus is dependent on multiple parameters, which may not be known, while the inside contribution—after characterization or calibration—can be determined from known parameters. The method therefore minimizes the error in the activation correction by basing the primary correction on the correction ratio $R_{outside}$ and correcting the introduced bias based on the known internal contribution and the separately determined ratio $R_{inside}$.

Taking this into account, the method according to the disclosure then comprises determining a first correction count rate C1 (due to the mud activation) based on the interval count rate $TC4^{measured}$ in W4 (block 206).

For determining the first correction count rate C1 (block 206), the method comprises determining a standard spectrum corresponding to gamma rays from the mud activation in the borehole annulus (block 206A), i.e. activated in the mud outside of the BHA when this mud passes in front of the gamma-ray detector 212. The standard spectrum may be measured experimentally for a given geometry, for instance in a laboratory before the job takes place thanks to a calibration setup or in situ, directly in the wellbore or determined by modeling. To determine the standard spectrum of the activated mud outside of the BHA in situ, the BHA may be static and disposed in the wellbore upside down so that the natural gamma ray detector is upstream of the neutron generator and the mud in the mud channel has not been irradiated by the neutron generator 110. Alternatively, when possible as for instance in the BHA of FIG. 1, the logging tool 114 comprising the neutron generator 110 may be set below the logging tool 105 comprising the gamma-ray detector 112.

The method then comprises determining from the standard spectrum a predetermined ratio $R_{outside}$ of the count rate $TC14_{outside}^{activation}$ situated outside of the correction interval and the interval count rate $$TC4_{outside}^{activation}, \text{ i.e. } R_{outside} = \frac{TC14_{outside}^{activation}}{TC4_{outside}^{activation}} \text{ (block 206B).}$$

As $R_{outside}$ is a constant (determined by measurements and/or modelling) and the interval count rate $TC4^{activation}$ is only due to mud activation, the first correction count rate C1 may be determined directly from the interval count rate and the ratio (block 206C) in accordance with the following formula (eq. 2):

$$\begin{aligned} C1 &= TC1_{outside}^{activation} \\ &= TC4_{outside}^{activation} + TC14_{outside}^{activation} \\ &= TC4_{outside}^{activation}(1 + R_{outside}) \\ &= TC4^{measured}(1 + R_{outside}) \end{aligned} \quad (2)$$

since $TC4^{measured} = TC4_{outside}^{activation}$ if the hypothesis is made that the only activated mud is the one coming from the annulus outside of the tool, as explained above.

Where the subscript outside indicates the count rates from the spectrum based on activated oxygen outside the BHA (in the borehole annulus).

As mentioned previously, this first correction approach is already applied in the art to take into account the combined standard spectrum corresponding to the mud activation inside of the BHA and outside of the BHA, assuming that the inside and outside activation spectra are identical in shape. However, the spectrum corresponding to the inside mud activation spectrum and the outside mud activation spectrum are not the same as can be seen in FIG. 2 and the relative contributions of the mud activated inside of the BHA and outside of the BHA may vary as a function of the drilling conditions, as explained above. As the spectra do not have the same shape, it is not accurate to use the inside standard spectrum, the outside standard spectrum or a combination thereof as a unique reference spectrum to determine the ratio.

In the present method, the first correction count rate is determined based only on one of the mud contributions, in particular the activation of the mud outside of the BHA. In fact, the correction is applied as if all the gamma-rays detected in the correction interval count rate were from activated mud outside of the BHA. Determining the first correction therefore includes determining the standard spectrum corresponding to the activated mud outside of the BHA at block 206.

The method according to the embodiment also comprises determining a second correction count rate C2 (block 208). This second correction count rate is determined independently of the measured count rate. It corrects the error induced by basing the first correction count rate only on the ratio for the standard spectrum of the activated mud outside of the BHA.

The second correction count rate C2 is a function of the total count rate from the activated mud inside the BHA in the correction interval (designated inside count rate or $TC1_{inside}^{activation}$ the following specification), and of the ratios $R_{inside}$ (corresponding to the ratio of the count rate outside of the correction interval and inside the correction interval $$R_{inside} = \frac{TC14_{inside}^{activation}}{TC4_{inside}^{activation}}$$

for the inside standard spectrum) and $R_{outside}$. The ratios $R_{outside}$ and $R_{inside}$ may be determined experimentally as described above and C2 may for example be determined as follows (eq. 3):

$$C2 = TC1_{inside}^{activation}\left(1 - \frac{R_{outside}}{R_{inside}}\right) \quad (3)$$

The derivation of equation (3) is based on the fact that $R_{inside}$ and $R_{outside}$ are known quantities and that the inside contribution can be computed from known parameters. Using the approach shown in equation (2) and combining them for both the inside and the outside contributions, one obtains equation (3).

The method therefore comprises determining a standard spectrum for the activated mud inside of the BHA and deriving from this spectrum the ratio Rinside (block 208A), determining at least a value representative of the inside signal (block 208B), and deriving from these values the correction factor C2 (block 208C). To determine the standard spectrum of the mud inside of the BHA only in situ, drill pipes may be added between the BHA and the drill bit so that the mud passing in front of the detector outside of the drill string is not activated anymore by the time it returns to the detector through the annulus.

C2 represents a correction to the count rate C1 determined previously. It takes into account the activation signal coming from the activated mud in the mud channel and the fact that $R_{outside}$ and $R_{inside}$ may not be equal. The corrected count rate $TC_{NGR}$, which represents the actual (net) count rate due to natural gamma rays, is then obtained as described in equation (3) below.

$$TC_{NGR} = TC14^{measured} - C1 - C2 \quad (3)$$

In a first embodiment, at block 208B, the inside signal is determined as a function of one or more of the downhole parameters such as neutron generator output, mud flow rate and mud composition, and borehole geometry. The BHA geometry, that is well-known, is also taken into account for obtaining C2.

While the neutron output affects the oxygen activation, the inside and outside relative contributions are unaffected as long as there are no fast variation in neutron output. The mud composition, i.e. its density, oxygen fraction and effective atomic number have only a second order impact on the inside-outside ratio. The main impact on the accuracy of the correction comes from the borehole size (average borehole size between the bit and the detector and borehole size at the detector location) and the flow rate of the mud, in addition to the BHA geometry (mud channel size and length). These parameters may have impact on the travel time of activated mud (such as average borehole size, mud channel size and length and mud flow) or on the volume of activated mud in front of the detector (such as mud channel size and borehole size at the detector location). In view of the above, the parameters relative to the mud flow or borehole geometry may be taken into account in priority. However, the inside signal may be determined as a function of at least any one of the parameters mentioned above or any combination thereof.

The value representative of the inside signal may for instance be measured accurately in view of the BHA geometry (that does not vary) and for known downhole parameters. Further, one or several parameters of the above list may be monitored during drilling via appropriate sensors available during drilling or via manual input of the operator (for example, regarding the mud composition). As the activation count rate varies linearly with the neutron generator output and the amount of barite in the mud, and as the fraction of oxygen activated in the mud may be determined as a function of the flow rate, the value representative of the inside signal may be computed based on the experimental measurements corrected for the current downhole parameters.

In a second embodiment, the value representative of the inside signal is a constant that is determined based on a statistical handling of a plurality of inside signals measured experimentally for a broad range of drilling conditions. In this case, measurements are for instance taken for several flow rates, and/or neutron generator output and/or mud composition and a value representative of the set of measured inside signal is chosen for being input in the second correction count rate. The representative value may for instance be the average or the median value of the set of inside signals measured experimentally. In a variant, the value representative of the inside signal may be determined as a measured inside signal for predetermined values of the downhole parameters, the predetermined values being for instance chosen to be typical for a lot of drilling jobs.

When the first and second correction count rates have been determined they are subtracted from the total count rate in order to correct the total count rate for oxygen activation of the mud (block 210).

Optionally, the method comprises determining a fluid loss (block 212) based on the measured gamma-ray spectrum.

For this, the total count rate for all or part of the energy spectrum is compared to the previous total count rate for the same energies. The part of the spectrum that is monitored may be the correction interval as it is due only to mud activation. A fluid loss indicator, such as a ratio or difference of the total count rate at a first time and at a second time may be computed and this indicator is compared to a threshold value. Indeed, if the total count rate decreases significantly and suddenly compared to the total count taken at a preceding time, it means that part of the activated mud has not passed in front of the gamma-ray detector when flowing upwards in the annulus and has therefore probably escaped in the formation. The gamma ray counts may be compared considering a short time scale (first and second times spaced only by a few minutes). Depth of the drill bit may then be associated with each of the measured spectra or count rates thanks to a known method and in view of the above, it is possible to locate the fluid loss in the formation: the loss is indeed situated at a depth situated between the depths associated to the first and second measurements.

A sudden influx (kick) in the borehole may have a similar signature and be detected as well, as the inflow may dilute the drilling mud, thereby reducing its specific radioactivity.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The disclosure concerns a method for correcting a downhole natural gamma-ray measurement performed in a wellbore wherein a gamma-ray measurement including at least a gamma-ray count rate is obtained by a gamma-ray detector disposed in a bottom hole assembly having a mud channel inside of the assembly, such that mud flows downwards in the mud channel and upwards outside of the assembly and a neutron source situated above the gamma-ray detector and activating the mud, the method including:

Determining from the gamma-ray measurement an interval count rate corresponding to a count rate of gamma-rays having an energy within a predetermined correction interval;

Computing an outside and an inside calibration ratio representative of gamma-rays generated by an activation of mud flowing respectively outside of the assembly and inside of the assembly, wherein the calibration ratio is a ratio of a gamma ray count rate in the correction interval to a gamma-ray count rate outside of the correction interval, Based on the outside calibration ratio and the interval count rate, determining a first correction count rate, Based on at least the inside and the outside calibration ratios, determining a second correction count rate, Subtracting from the total count rate the first and second correction count rates.

The second correction count rate may be determined independently of the gamma-ray measurement.

It may be determined at least based on a value representative of an inside interval count rate, corresponding to the interval count rate of gamma-ray due to the activation of mud inside the assembly. The value representative of the inside interval count rate from the activation of mud may be determined as a function of at least one downhole parameter in an embodiment. Such downhole parameters may include a parameter relative to the mud composition (such as density, oxygen fraction, etc.) and/or to the borehole geometry (such as borehole size at the detector location or average size of the borehole between bit and detector) and/or to the mud flow and/or a parameter relative to the neutron source output.

In an embodiment, one or more of the downhole parameters may be measured during drilling. The inside interval count rate value may be determined based on the measured downhole parameters.

In another embodiment, the value representative of the inside internal count rate may be a statistical value representative of a set of values of inside internal count rates measured for different values of the downhole parameters.

In another embodiment, the value representative of the inside internal count rate may be based on typical values of each of the downhole parameters.

The correction interval comprises energies above 2.615 MeV, in particular energies above 3 MeV, such as above 3.5 MeV.

The correction may be performed on a post-processed gamma-ray measurement.

The method may comprise determining the outside and/or inside calibration ratios in a laboratory outside of the wellbore. Alternatively, the outside and/or inside calibration ratios may be determine in the wellbore or via modelling. Determining the inside and outside calibration ratios may also include determining inside and outside standard spectra corresponding to the count rate as a function of energy of the activation of mud flowing respectively inside of and outside of the assembly.

The method may also include determining a fluid loss in the formation or influx from the formation based on at least a gamma-ray measurement. This operation may comprise comparing a first gamma-ray measurement obtained at a first time in the wellbore with a second gamma-ray measurement obtained at a second time in the wellbore, for instance comparing a total gamma-ray count in the correction interval.

The disclosure also relates to a system for correcting a downhole natural gamma-ray measurement performed in a wellbore wherein a gamma-ray measurement including at least a gamma-ray count rate is obtained by a gamma-ray detector disposed in a bottom hole assembly having a mud channel inside the assembly, such that mud flows downwards in the mud channel and upwards outside of the assembly, and a neutron source situated above the gamma-ray detector and activating the mud, and wherein the system further comprises a processor configured to:

Determine from the gamma-ray measurement an interval count rate corresponding to gamma-rays having an energy within a predetermined correction interval;

Based on an outside calibration ratio corresponding to the ratio of a gamma ray count rate in the correction interval to a gamma-ray count rate outside of the correction interval representative of gamma-rays generated by the activation of mud flowing outside of the assembly and on the interval count rate, determine a first correction count rate, Based on at least an inside calibration ratio corresponding to the ratio of a gamma ray count rate in the correction interval to a gamma-ray count rate outside of the correction interval representative of the activation of mud flowing inside of the assembly and on the outside calibration ratio, determine a second correction count rate, Subtract from the total count rate obtained from gamma-ray measurement the first and second correction count rates.

Figure 1:
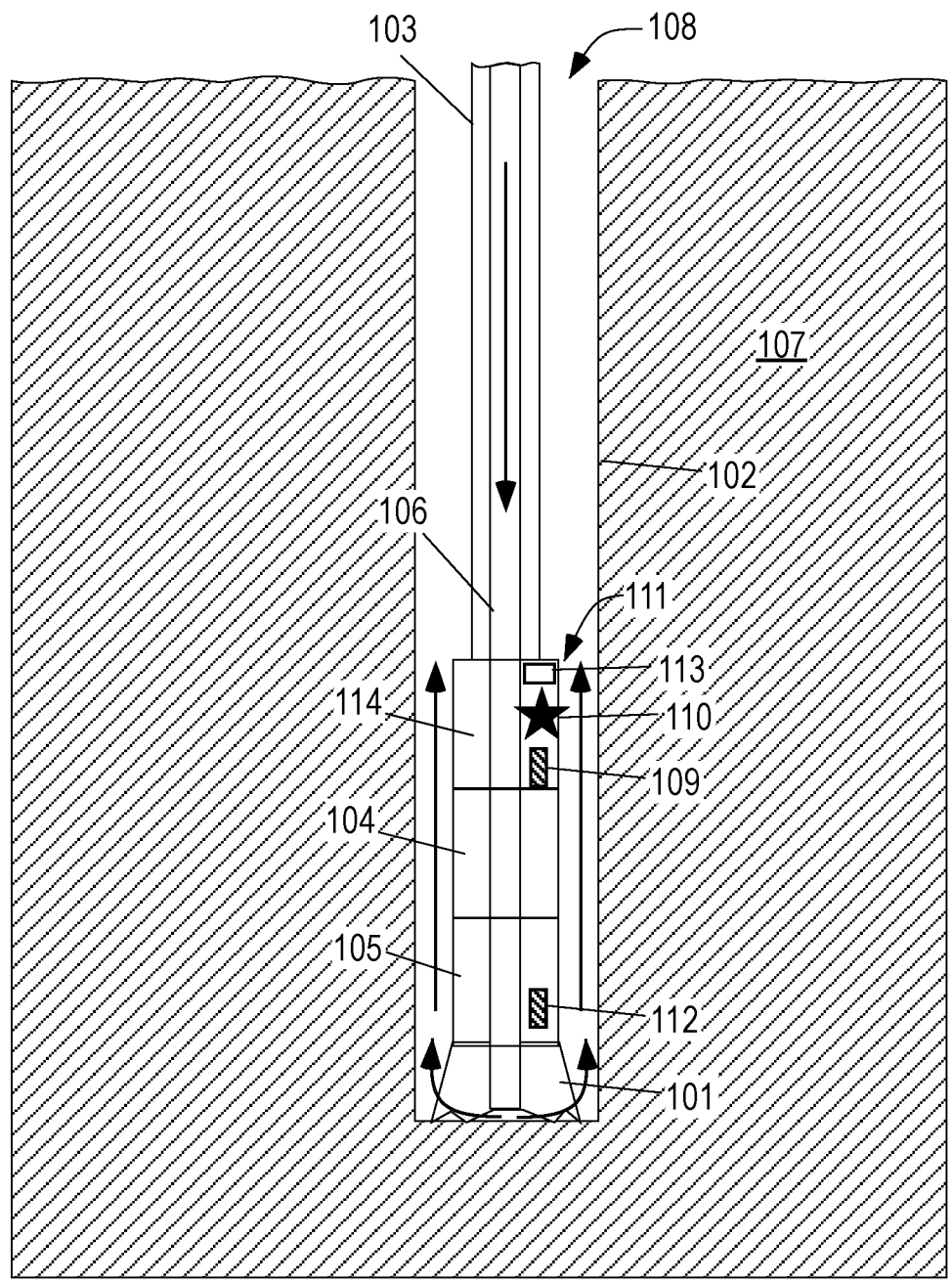
FIG. 1 is a schematic view of a drill string including a bottom hole assembly (BHA) for drilling a borehole.

The system may comprise the bottom hole assembly having the mud channel, the neutron source and the gamma-ray detector for performing the gamma-ray measurement. Such an assembly may comprise a first downhole tool including the neutron source and a second downhole tool including the gamma-ray detector. Gamma-ray detector and neutron source may also be part of a same downhole tool of the BHA. The BHA may have any architecture, for instance the mud channel may be situated closer to the borehole wall than the source or generator (as shown in FIG. 1) or further from the borehole wall than the source or generator (as shown in FIG. 5). The processor may be part of the assembly or remote from the assembly. It may be situated for instance on the well site, at the surface, or remote from the well site.

The system may also comprise a calibration setup for determining the inside and/or the outside calibration ratios. Alternatively, the calibration ratios may be determined in situ.

The invention claimed is:

1. A method for correcting a downhole natural gamma-ray measurement performed in a wellbore wherein a gamma-ray measurement including at least a gamma-ray count rate is obtained by a gamma-ray detector disposed in a bottom hole assembly having a mud channel inside of the assembly, such that mud flows downwards in the mud channel and upwards outside of the assembly and a neutron source situated above the gamma-ray detector and activating the mud, the method including:

Determining from the gamma-ray measurement an interval count rate corresponding to a count rate of gamma-rays having an energy within a predetermined correction interval, wherein the correction interval comprises energies above 2.615 MeV;

Computing an outside and an inside calibration ratio representative of gamma-rays generated by an activation of mud flowing respectively outside of the assembly and inside of the assembly, wherein the calibration ratio is a ratio of a gamma ray count rate in the correction interval to a gamma-ray count rate outside of the correction interval, Based on the outside calibration ratio and the interval count rate, determining a first correction count rate, Based on at least the inside and the outside calibration ratios, determining a second correction count rate, wherein the sum of the first and second correction account for the count rate from the mud activated inside and outside of the assembly Subtracting from the total count rate the sum of the first and second correction count rates, Based on the corrected count rate, determining at least a natural gamma-ray spectrum of the formation.

2. The method according to claim 1, wherein the second correction count rate is determined independently of the gamma-ray measurement.

3. The method according to claim 1, wherein the second correction count rate is determined at least based on a value representative of an inside interval count rate, corresponding to the interval count rate of gamma-ray due to the activation of mud inside the assembly.

4. The method according to claim 3, wherein the value representative of the inside interval count rate from the activation of mud is determined as a function of at least a measured downhole parameter.

5. The method according to claim 4, wherein the at least one measured downhole parameter is relative to one or more of the following:
Composition of the mud,
Flow rate of the mud,
Size of the borehole,
Output of the neutron source.

6. The method according to claim 4, comprising measuring the at least one measured downhole parameter during drilling.

7. The method according to claim 3, wherein the value representative of the inside interval count rate is a statistical value representative of a set of values of inside interval count rates measured for different values of downhole parameters.

8. The method according to claim 1, wherein the correction interval comprises above 3 MeV.

9. The method according to claim 1, wherein the correction is performed on a post-processed gamma-ray measurement.

10. The method according to claim 1, comprising determining the outside and inside calibration ratios in a laboratory outside of the wellbore.

11. The method according to claim 1, comprising determining the inside and outside calibration ratios in the wellbore.

12. The method according to claim 1, wherein determining the inside and outside calibration ratios includes determining inside and outside standard spectra corresponding to the count rate as a function of energy of the activation of mud flowing respectively inside of and outside of the assembly.

13. The method according to claim 1, further comprising determining a fluid loss in the formation or influx from the formation based on at least a gamma-ray measurement.

14. The method according to claim 13, wherein determining a fluid loss or influx comprises comparing a first gamma-ray measurement obtained at a first time in the wellbore with a second gamma-ray measurement obtained at a second time in the wellbore.

15. The method according to claim 14, wherein the comparing the first and second gamma-ray measurements corresponds to comparing a total gamma-ray count in a predetermined energy range for each measurement wherein the energy range is the correction interval.

16. A system for correcting a downhole natural gamma-ray measurement performed in a wellbore wherein a gamma-ray measurement including at least a gamma-ray count rate is obtained by a gamma-ray detector disposed in a bottom hole assembly having a mud channel inside the assembly, such that mud flows downwards in the mud channel and upwards outside of the assembly, and a neutron source situated above the gamma-ray detector and activating the mud, and wherein the system further comprises a processor configured to:

Determine from the gamma-ray measurement an interval count rate corresponding to gamma-rays having an energy within a predetermined correction interval, wherein the correction interval comprises energies above 2.615 MeV;

Based on an outside calibration ratio corresponding to the ratio of a gamma ray count rate in the correction interval to a gamma-ray count rate outside of the correction interval representative of gamma-rays generated by the activation of mud flowing outside of the assembly and on the interval count rate, determine a first correction count rate, Based on at least an inside calibration ratio corresponding to the ratio of a gamma ray count rate in the correction interval to a gamma-ray count rate outside of the correction interval representative of the activation of mud flowing inside of the assembly and on the outside calibration ratio, determine a second correction count rate, wherein the sum of the first and second correction account for the count rate from the mud activated inside and outside of the assembly Subtract from the total count rate obtained from gamma-ray measurement the sum of first and second correction count rates, Based on the corrected gamma ray count, determining at least a property natural gamma-ray spectrum of the formation.

17. The system according to claim 16, comprising the bottom hole assembly having the mud channel, the neutron source and the gamma-ray detector for performing the gamma-ray measurement.

18. The system according to claim 16, wherein the assembly comprises a first downhole tool including the neutron generator and a second downhole tool including the gamma-ray detector.

19. The system according to claim 16, wherein the processor is part of the assembly or remote from the assembly.

20. The system according to claim 16, comprising at least a calibration setup for determining the inside and/or the outside calibration ratios.

* * * * *